(12) United States Patent
Wakabayashi et al.

(10) Patent No.: US 7,965,756 B2
(45) Date of Patent: Jun. 21, 2011

(54) OPTICAL ELEMENT FOR GAS LASER AND GAS LASER APPARATUS USING THE SAME

(75) Inventors: Osamu Wakabayashi, Hiratsuka (JP); Shinji Nagai, Hiratsuka (JP); Kouji Kakizaki, Oyama (JP); Satoshi Tanaka, Oyama (JP)

(73) Assignee: Gigaphoton Inc., Toyko (JP)

( * ) Notice: Subject to any disclaimer, the term of this patent is extended or adjusted under 35 U.S.C. 154(b) by 0 days.

(21) Appl. No.: 12/545,495

(22) Filed: Aug. 21, 2009

(65) Prior Publication Data

US 2010/0054297 A1    Mar. 4, 2010

(30) Foreign Application Priority Data

Aug. 22, 2008  (JP) ................................. 2008-213531

(51) Int. Cl.
*H01S 3/22* (2006.01)
(52) U.S. Cl. ........................................ 372/55; 372/103
(58) Field of Classification Search .................... 372/55, 372/103
See application file for complete search history.

(56) References Cited

U.S. PATENT DOCUMENTS

| 7,466,728 | B2* | 12/2008 | Clubley et al. ................ 372/21 |
| 2003/0219056 | A1 | 11/2003 | Yager | |
| 2006/0055834 | A1* | 3/2006 | Tanitsu et al. ................ 349/5 |
| 2008/0074632 | A1* | 3/2008 | Tanitsu et al. ................ 355/71 |
| 2008/0094701 | A1* | 4/2008 | Natura et al. ................ 359/483 |
| 2008/0225921 | A1* | 9/2008 | Kuss et al. ................ 372/57 |
| 2010/0177377 | A1* | 7/2010 | Rytz ............................. 359/328 |

FOREIGN PATENT DOCUMENTS

| JP | 11-177173 | 7/1999 |
| JP | 2002-353545 A1 | 12/2002 |
| JP | 2006-73921 A1 | 3/2006 |

* cited by examiner

*Primary Examiner* — Minsun Harvey
*Assistant Examiner* — Phillip Nguyen
(74) *Attorney, Agent, or Firm* — Kratz, Quintos & Hanson, LLP

(57) ABSTRACT

At least either of the light entering plane or the light exiting plane is parallel to the (111) crystal face of the $CaF_2$ crystal and the laser beam entering from the entering plane passes through the plane located between the [111] axis and the first azimuth axis in the locus of rotation of the [001] axis around the [111] axis and including the [111] axis and the first azimuth axis, the plane located between the [111] axis and the second azimuth axis in the locus of rotation of the [010] axis around the [111] axis and including the [111] axis and the second azimuth axis or the plane located between the [111] axis and the third azimuth axis in the locus of rotation of the [100] axis around the [111] axis and including the [111] axis and the third azimuth axis and exits from the exiting plane.

8 Claims, 13 Drawing Sheets

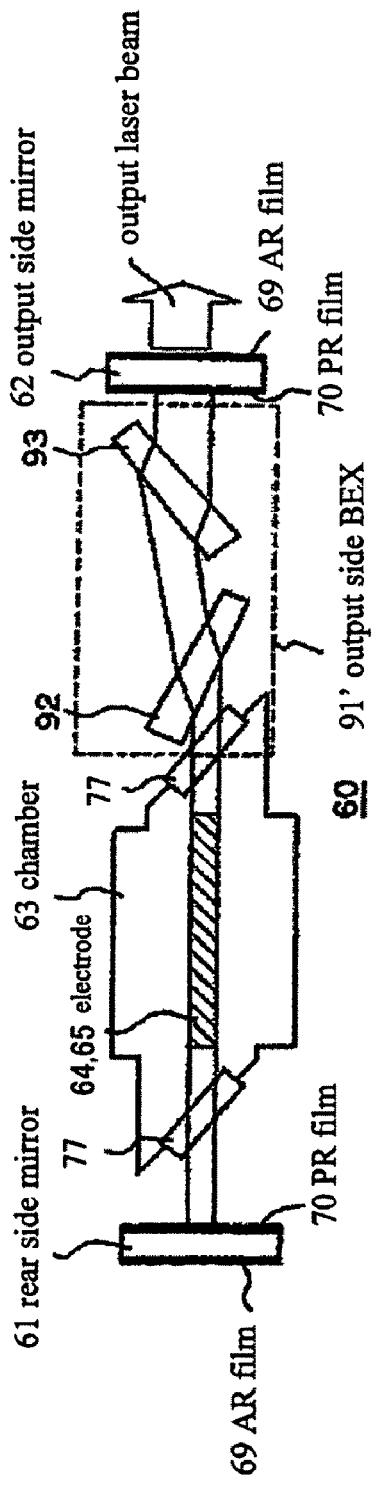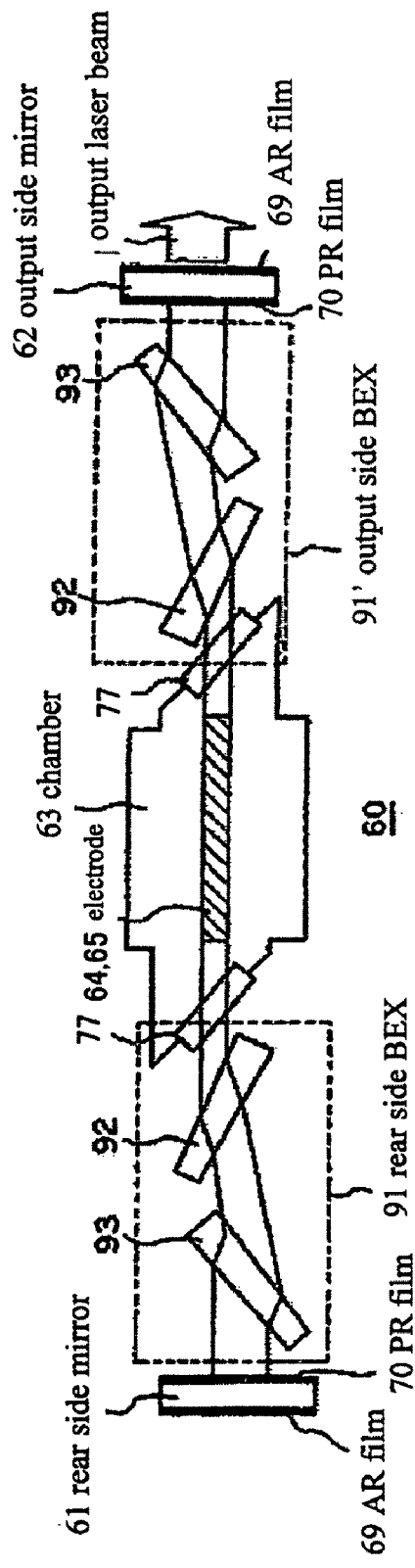
FIG. 9 (a)
FIG. 9 (b)

OPTICAL ELEMENT FOR GAS LASER AND GAS LASER APPARATUS USING THE SAME

CROSS REFERENCE TO RELATED APPLICATIONS

This application claims benefit of Japanese Application No. 2008-213531 filed in Japan on Aug. 22, 2008, the contents of which are incorporated by this reference.

BACKGROUND OF THE INVENTION

The present invention relates to an optical element for a gas laser and also to a gas laser apparatus using the same. More particularly, the present invention relates to an optical element for an ultraviolet gas laser to be used in a semiconductor exposure apparatus having an excimer laser or a molecular fluorine laser and also to a gas laser apparatus using the same.
(Exposure Light Source)

In the trend of making semiconductor integrated circuits finer and more integrated, an improved resolution is required for semiconductor exposure apparatus. To meet this demand, efforts are being paid to use shorter wavelength for the light emitted from an exposure light source. A gas laser apparatus is being popularly employed as exposure light sources in place of conventional mercury lamps. KrF excimer laser apparatus for emitting deep ultraviolet rays of a wavelength of 248 nm and ArF excimer layer apparatus for emitting vacuum ultraviolet rays of a wavelength of 193 nm are being used as gas laser apparatus for exposure. Attempts are being made to apply a liquid immersion technique of reducing the apparent wavelength of an exposure light source by filling the gap between an exposure lens and a wafer, thereby shifting the refractive index, to an ArF excimer laser apparatus as an exposure technique of the next generation. With ArF excimer laser liquid immersion, the wavelength is reduced to 134 nm when immersed in pure water. $F_2$ laser liquid immersion exposure may possibly be adopted for $F_2$ (molecular fluorine) laser apparatus that emit vacuum ultraviolet rays of a wavelength of 157 nm as exposure light sources of the third generation. The wavelength is believed to be made equal to 115 nm by $F_2$ laser liquid immersion exposure.
(Exposure Optical Element and Chromatic Aberration)

Many semiconductor exposure apparatus adopt a projection optical system as the optical system thereof. In a projection optical system, optical elements such as lenses having different refractive indexes are combined to correct the chromatic aberration. At present, optical materials that are suitable as lens materials of projection optical systems for the wavelength (ultraviolet) range between 248 nm and 157 nm of lasers operating as exposure light sources are only synthetic quartz and $CaF_2$. For this reason, monochromatic lenses of the total refraction type that are formed only by synthetic quartz are adopted as projection lenses for KrF excimer lasers, whereas partially achromatic lenses of the total refraction type that are formed by synthetic quartz and $CaF_2$ are adopted as projection lenses for ArF excimer lasers. However, the natural oscillation spectrum line width of both KrF excimer lasers and ArF excimer lasers is as wide as about 350 to 400 pm so that, when such a projection lens is used, chromatic aberration occurs to reduce the resolving power. Therefore, the spectrum line width of the laser beams emitted from such gas laser apparatus needs to be narrowed to such a degree at which the chromatic aberration can be disregarded. For this reason, a band narrowing module having a band narrowing element (etalon, grating or the like) is arranged in the laser resonators of such gas laser apparatus to realize band narrowing of the spectrum line width.
(Liquid Immersion Lithography and Polarized Light Illumination)

As described above, in the case of ArF excimer laser liquid immersion lithography, the refractive index will be 1.44 when $H_2O$ is employed as medium so that the lens numerical aperture NA that is proportional to the refractive index can be theoretically increased to 1.44 times of the conventional numerical aperture. As the NA is increased, the influence of the degree of polarization of the laser beam that is the light source will increase. While there is no influence in the case of TE polarized light whose direction of polarization is parallel to the direction of the mask pattern, the image contrast will become low in the case of TM polarized light whose direction of polarization is orthogonal to the direction of the mask pattern. This is because the direction of the electric field vector at the focal point on the wafer is different in the latter case so that the intensity becomes weak as the incident angle to the wafer increases if compared with the former case where the direction of the electric field vector is same and identical. The influence thereof is intensified when the NA approaches or exceeds 1.0 and ArF excimer laser liquid immersion falls into such a case. Therefore, a desired state of polarization needs to be controlled for the illumination system of an exposure apparatus as described above. To control such polarized light illumination, the polarization of the laser beam input to the illumination system of the exposure apparatus is required to be in a linearly polarized state. The degree of polarization is the ratio of the linear polarization and the non-linear polarization that are measured and the polarization of a laser beam is required to maintain a high degree of polarization.
(Prior Art for Raising Polarization Purity)

The techniques described in Patent Document 1 and Patent Document 2 are known as techniques for raising the degree of polarization of a laser beam.

The technique described in Patent Document 1 provides a method of preventing degree of polarization from being degraded by birefringence that arises when light passes the inside of an optical element by making a laser beam to be transmitted perpendicularly to the cleavage crystal face (111) of calcium fluoride crystal of the optical element such as a beam expander prism or a front mirror to be used for a laser.

The technique described in Patent Document 2 provides a method of preventing degree of polarization from being degraded by intrinsic birefringence that arises when light passes the inside of an optical element by making the optical axis of a laser beam to be transmitted perpendicularly relative to the (100) crystal face of the calcium fluoride crystal of the optical element used for a laser.

However, the above-described conventional art has the following problem.

Patent Document 1 does not describe any specific means for actually making an optical axis pass perpendicularly relative to the (111) crystal face of a window that operates as optical element and also making the surface thereof show the Brewster angle and then a crystal orientation face of calcium fluoride crystal that is hard to a certain extent cannot be selected as the face to be cut to produce a window if the above two objectives are to be achieved simultaneously so that it is not possible to realize high precision polishing with low surface coarseness. If it is not possible to polish with low surface coarseness, flaws referred to as latent flaws are left in a region within sub-microns from the polished surface. Such latent flaws absorb the laser beam irradiated from a laser to damage the crystal surfaces and generate a defect of allowing fluorine to come out to consequently give rise to a problem that the crystal can no longer be used as window for a laser chamber.

The technique described in Patent Document 2 is to prevent degradation of degree of polarization due to intrinsic birefringence by arranging a laser beam to pass perpendicularly relative to the (100) crystal face of an optical element. Stress birefringence that arises when stress is applied is largest in the direction that is perpendicular relative to the (100) crystal face and, when it is used as chamber window, stress birefringence can possibly take place due to the stress that arises when holding the window, the gas pressure of several atmospheric pressures in the chamber and/or the stress caused by the thermal stress that arises by laser beam irradiation. Additionally, a cut surface is produced at an angle of 17.58° or 26.76° relative to the (111) crystal face and cut surfaces are used as the opposite surfaces of the chamber window so that the following two problems arise. One is that, since the surface coarseness of the cut surfaces does not allow small high precision polishing to reduce the threshold value for the surface damage caused by laser beam irradiation. The other is that, when used as laser chamber window, it is subjected to gas pressure of about 4,000 hPa so that it can be broken at the (111) crystal face that is apt to be cleaved. Furthermore, when the cut surface is produced at 17.58° relative to the (111) crystal face, the angle formed by the chamber window and the optical axis is 70° and hence Fresnel reflection of P-polarized light and that of S-polarized light are 4.2% and 30.0% respectively so that, although the P-polarized light component is selected, the Fresnel reflection of P-polarized light is large as a result of being transmitted through the window to make it impossible to secure the laser output.

Thus, Patent Document 2 discloses a technique of preventing degradation of degree of polarization due to intrinsic birefringence and stress birefringence from taking place by means of an optical element for an ultraviolet gas laser such as a window made of calcium fluoride crystal and having two faces, one of which, or face 2, is adapted to receive ultraviolet rays entering through it and exiting from the other face and at least one of which is parallel to the (110) crystal face of the calcium fluoride crystal and also preventing cracks and defects from arising by laser beam irradiation by smoothing the cut surfaces.

[Patent Document 1] JP-A-11-177173
[Patent Document 2] U.S. Patent Application Publication No. 2003/219056 Specification
[Patent Document 3] JP-A-2002-353545
[Patent Document 4] JP-A-2006-073921

Thus, the technique disclosed in Patent Document 4 is designed to prevent degradation of degree of polarization due to intrinsic birefringence and stress birefringence and also prevent to a certain extent the surface damage of calcium fluoride crystal that can be caused by laser beam irradiation by means of high precision polishing of reducing the surface coarseness to a certain extent by selecting the (110) crystal face of the calcium fluoride crystal as the face to be cut.

In view of the above-identified problems of the prior art, it is therefore the object of the present invention to reduce latent flaws and prevent the surface damage of calcium fluoride crystal that can be caused by laser beam irradiation by cutting the calcium fluoride crystal along the crystal face of the (111) crystal face that is hardest and subjecting the crystal face to high precision polishing for low surface coarseness. Then, the ultimate object of the present invention is to provide an optical element for a gas laser such as Brewster window or beam expander prism formed by using calcium fluoride crystal that can reduce the Fresnel reflectance of P-polarized light, realize a high degree of polarization and also suppress degradation of itself due to intense ultraviolet (ArF in particular) laser beam irradiation and also a gas laser apparatus.

SUMMARY OF THE INVENTION

In an aspect of the present invention, the above object is achieved by providing an optical element for a ultraviolet gas laser, the optical element being formed by using calcium fluoride crystal and having a light entering plane and a light exiting plane, ultraviolet rays entering by way of the light entering plane and exiting from the light exiting plane, the optical element including: at least either of the light entering plane or the light exiting plane being parallel to the (111) crystal face of the calcium fluoride crystal; the laser beam entering from the entering plane passing through: the plane located between the [111] axis and the first azimuth axis in the locus of rotation of the [001] axis around the [111] axis and including the [111] axis and the first azimuth axis; the plane located between the [111] axis and the second azimuth axis in the locus of rotation of the [010] axis around the [111] axis and including the [111] axis and the second azimuth axis; or the plane located between the [111] axis and the third azimuth axis in the locus of rotation of the [100] axis around the [111] axis and including the [111] axis and the third azimuth axis; and exiting from the exiting plane.

The incident angle of the laser beam at the entering plane is within a range between 24.9° and 68.73°.

The rotation angle of the first azimuth axis from the [001] axis and the rotation angle of the second azimuth axis from the axis and the rotation angle of the third azimuth angle from the [100] axis are respectively not smaller than 34° and not greater than 36°, not smaller than −34° and not greater than −36°.

The calcium fluoride crystal is cut at the (111) crystal faces for the both surfaces thereof and the laser beam entering the crystal is located at the position rotated counterclockwise by 30°±10° around the [111] axis from the position where it passes through the plane including the [111] axis and the [001] axis, at the position rotated counterclockwise by 30°±10° around the [111] axis from the position where it passes through the plane including the [111] axis and the [010] axis or at the position rotated counterclockwise by 30°±10° around the [111] axis from the position where it passes through the plane including the [111] axis and the axis.

In another aspect of the present invention, there is provided a gas laser apparatus using optical elements for a gas laser according to the present invention, the apparatus including: a laser chamber; optical resonators arranged respectively at one side and at the opposite side of the laser chamber; laser gas contained in the inside of the laser chamber in a sealed state; a means for energizing the laser gas; and two windows arranged in the laser chamber to allow the laser beam generated from the energized laser gas to exit to the outside of the laser chamber; the windows being arranged on the optical axes of the optical resonators; each of the windows being formed by an optical element for a gas laser.

Each of the windows is arranged at the position rotated counterclockwise by 30°±10° around the [111] axis from the position where it passes through the plane including the [111] axis and the axis, at the position rotated counterclockwise by 30°±10° around the [111] axis from the position where it passes through the plane including the [111] axis and the [010] axis or the position rotated counterclockwise by 30°±10° around the [111] axis from the position where it passes through the plane including the [111] axis and the [100] axis as viewed from the inside of the laser chamber.

There is also provided a gas laser apparatus using optical elements for a gas laser according to the present invention, the apparatus including: a laser chamber; optical resonators arranged respectively at one side and at the opposite side of the laser chamber; laser gas contained in the inside of the laser chamber in a sealed state; a means for energizing the laser gas; two windows arranged in the laser chamber to allow the laser beam generated from the energized laser gas to exit to the outside of the laser chamber; and a beam splitter for splitting the laser beam; the windows being arranged on the optical axes of the optical resonators; the beam splitter being formed by an optical element for a gas laser.

There is also provided a gas laser apparatus using optical elements for a gas laser according to the present invention, the apparatus including: a laser chamber; optical resonators arranged respectively at one side and at the opposite side of the laser chamber; laser gas contained in the inside of the laser chamber in a sealed state; a means for energizing the laser gas; two windows arranged in the laser chamber to allow the laser beam generated from the energized laser gas to exit to the outside of the laser chamber; and a beam expanding optical system; wedge substrates of the beam expanding optical system being formed by an optical element for a gas laser.

Thus, an optical element for a gas laser according to the present invention makes it possible to realize high precision polishing with low surface coarseness by using the (111) crystal face as crystal surface and prevent the surface damage that can be caused by laser beam irradiation due to latent flaws. Then, it is possible to raise the degree of polarization by arranging the crystal so as to reduce the Fresnel reflectance of P-polarized light. Additionally, it is possible to suppress degradation with time of the degree of polarization of the output laser beam due to a large number of shots of the operated laser by arranging the crystal so as to make the optical axis of the laser and the crystal axis show a relationship that suppresses degradation of the inside of the crystal by a highly intense ultraviolet laser beam.

Still other objects and advantages of the invention will in part be obvious and will in part be apparent from the specification.

Thus invention accordingly includes the features of construction, combinations of elements and arrangement of parts which will be exemplified in the construction hereinafter set forth and the scope of the invention will be indicated in the claims.

BRIEF DESCRIPTION OF THE DRAWINGS

FIG. 9 is an illustration of laser beam paths produced when one or two beam expanding optical systems, each being formed by combining two wedge substrates, are arranged in the resonator of an amplification stage laser.

DESCRIPTION OF EXEMPLARY EMBODIMENTS

Now, an optical element for an ultraviolet gas laser and an ultraviolet gas laser according to the present invention will be described by way of embodiments.

Figure 1:
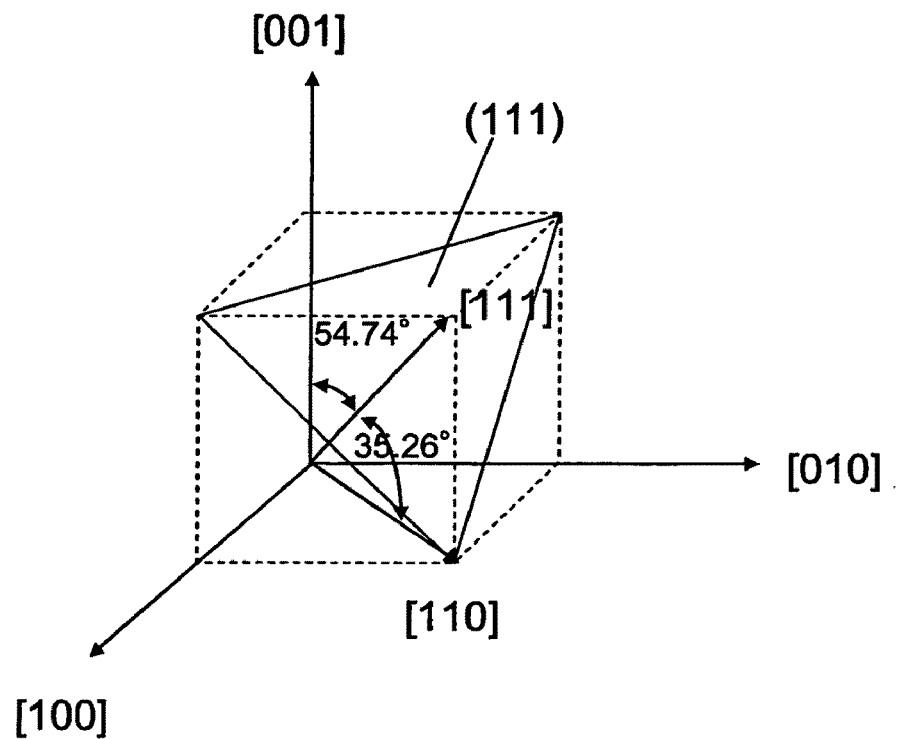
FIG. 1 is a schematic illustration of the crystal lattice of $CaF_2$.

FIG. 1 is a schematic illustration of the crystal lattice of $CaF_2$. In the embodiment that will be described below, $CaF_2$ crystal is cut along the (111) crystal face in accordance with the crystal orientation. $CaF_2$ crystal has a structure of face-centered cubic lattice as illustrated in FIG. 1.

Figure 2:
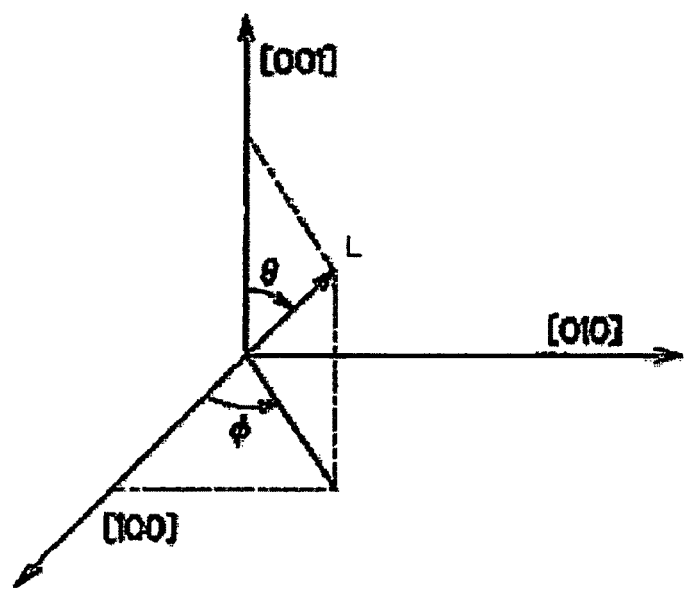
FIG. 2 is a schematic illustration of the definition of angles $\theta$ and $\phi$ of the light proceeding direction L relative to the axis [001] and [100] of $CaF_2$ crystal.

As angles $\theta$ and $\phi$ are defined for the proceeding direction L of light relative to the axes [001] and [100] of $CaF_2$ crystal respectively as illustrated in FIG. 2, the direction of the [111] axis is defined by $\phi=45°$ and $\theta=54.74°$ as illustrated in FIG. 2. The surface of the (111) crystal face is hardest and hence harder than any other surfaces of crystal axes and hence it can be polished with low surface coarseness and few latent flaws.

Figure 3:
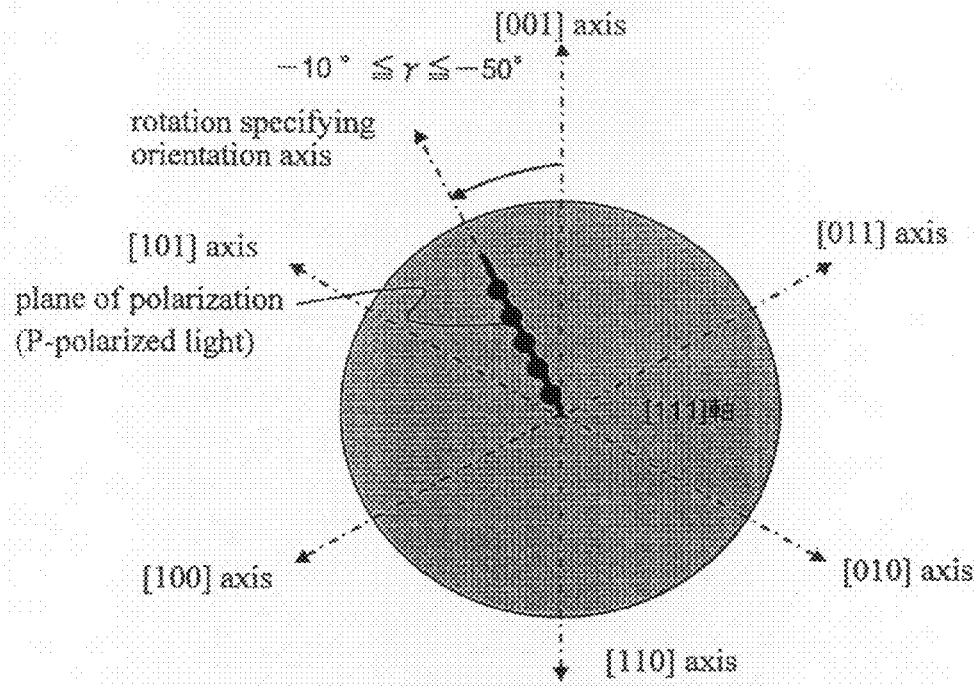
FIG. 3 is a schematic cross-sectional view and a schematic top view of a window formed according to the present invention by using $CaF_2$.
Figure 3:
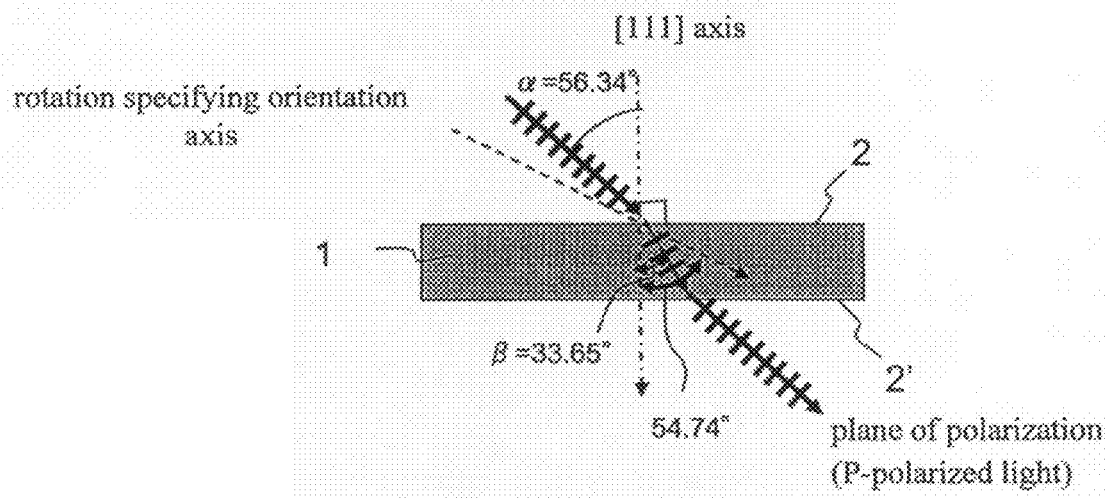

FIG. 3 is schematic views of window 1 formed by using $CaF_2$ (calcium fluoride) according to the present invention. FIG. 3(a) is a top view of the window 1 and FIG. 3(b) is a cross-sectional view of the window 1.

FIG. 3(a) is a view of the $CaF_2$ crystal from right above the [111] axis. The face orientation axes of the $CaF_2$ crystal are shown radially. Since the $CaF_2$ crystal is a face-centered cubic lattice as illustrated in FIG. 1, the axes of crystal orientation is threefold symmetrical when the [111] axis is the axis of symmetry. Therefore, if the $CaF_2$ crystal is viewed from right above and the axis is selected as reference axis, while the angle as viewed clockwise is positive and the angel as viewed counterclockwise is negative, then the angle formed by the [001] axis and the [011] axis is 60° and the angle formed by the [001] axis and the [010] axis is 1200, whereas the angle formed by the [001] axis and the axis is 1800 and the angle formed by the [001] axis and the axis and the angle formed by the [001] axis and the [100] axis are −600 and −1200 respectively.

Assume that the orientation axis obtained by rotating the [001] axis by angle $\gamma$ around the [111] axis is defined as rotation specifying orientation axis, or the first orientation axis, and the angle $\gamma$ is defined as rotation specifying orientation angle. However, note that the [011] axis or the [101] axis may be selected as reference axis instead of the [001] axis because the CaF$_2$ crystal is a face-centered cubic lattice as described above. If such is the case, the rotation specifying orientation axis is the second orientation axis or the third orientation axis, whichever appropriate.

FIG. 3(b) is a cross-sectional view of the CaF$_2$ crystal taken along the plane that includes the rotation specifying orientation axis and the [111] axis.

The window 1 that is made of CaF$_2$ crystal is polished at the surfaces 2 and 2' that are parallel faces relative to the (111) crystal face. In this embodiment, for instance, a laser beam of P-polarized light enters the window at the center thereof at incident angle α which is substantially equal to the Brewster angle of 56.34° in a plane that includes the rotation specifying orientation axis and the [111] axis. Then, light is refracted at the surface 2 with angle of refraction β of 33.65° according to the Snell's law. The CaF$_2$ crystal is so arranged that the optical axis of refraction is transmitted in the plane that includes the [111] axis and the rotation specifying orientation axis of the CaF$_2$ crystal within the angle formed by the [111] axis and the rotation specifying orientation axis (0°<β<54.74°). After being transmitted through the CaF$_2$ crystal, the laser beam is refracted again at the surface 2' as at the surface 2 according to the Snell's law. Then, the plane of polarization of the laser beam is made to be parallel with the plane that includes the rotation specifying orientation axis and the [111] axis and exits the window as linearly polarized light of P-polarized light relative to the window so as to propagate in the gas once again.

Degradation with time of the degree of polarization of the output laser beam due to the number of shots of the operated laser can be suppressed and prevented by confining the rotation specifying orientation angle γ within a range between −10° and −50° or between +10° and +50°. Note, however, that the incident angle of the laser beam will be so selected that the laser beam obliquely enters the window (at an angle greater than 0°) in order to suppress the surface reflection of the window as will be described in greater detail hereinafter.

More preferably, the rotation specifying orientation angle γ is within a range between −30° and −40° or between +30° and +40°. Most preferably, the rotation specifying orientation angle γ is within a range between −34° and −36° or between +34° and +36°.

Now, the relationship between the Brewster angle and polarized light will be described below. Generally, the chamber window that is used in a gas laser resonator is more often than not arranged at the Brewster angle relative to the optical axis. This is because the Fresnel reflection of the P-polarized component of light entering the window is reduced to nil at the window surface when the Brewster angle is employed so that the internal absorption of the crystal becomes very small and light is transmitted by nearly 100% to eliminate the loss of the laser beam when it passes through the window so as not to reduce the output energy level.

The laser beam is made to reciprocate several to tens of several times within the resonator before it is output but the P-polarized light component is transmitted without being attenuated and amplified as it passes through the laser medium, although the S-polarized light component is attenuated due to Fresnel reflection. Thus, as a result, the laser beam is output substantially as linearly polarized light that is polarized in the direction of P-polarization.

In the case of a laser of a narrowed band, the laser beam is expanded by means of prisms in order to narrow the spectral line width and made to enter a grating that is a wavelength dispersing element. A plurality of expanding prisms is employed and a large angle is selected for the incident angle relative to each expanding prism in order to raise the overall expanding ratio of the beam. The reason for this arrangement is that the spectral line width and the expanding ratio of a laser beam are substantially inversely proportional relative to each other. The inclined planes of the expanding prisms are coated with anti-reflection film in order to reduce the reflection loss if the incident angle is large (larger than the Brewster angle) relative to the P-polarized light. This is because anti-reflection film shows a high reflectance relative to S-polarized light and hence the P-polarized light component survives as a result of laser oscillation to make the degree of polarization of the output laser beam very high. Then, the window of the laser chamber is inclined in order to minimize the reflection loss of the P-polarized light component that is selectively transmitted through the prisms. The reflection loss of P-polarized light at the window is 0% when the window is arranged at the Brewster angle as pointed out above and hence a sufficient laser output can be obtained. In the case of an ArF excimer laser (wavelength: 193.368 nm), the refractive index n of calcium fluoride is 1.501958 at 20° C. so that the Brewster angle will be 56.336°. In the case of an F$_2$ laser (wavelength: 157.63 nm), the refractive index n of calcium fluoride is 1.559261 at 20° C. so that the Brewster angle will be 57.3° C.

Now, how polarized light changes by birefringence will be described below. Generally, light propagating through crystal is a linear combination of two waves that are in a linearly polarized state and orthogonal relative to each other. Both the state of polarization and the direction of polarization of light are determined by the phase velocity and the amplitude of each of the waves. When birefringence occurs in the crystal, the phase velocity of the light beam propagating through crystal is shifted depending on the direction of polarization of the light beam. Then, as the light beam that is linearly polarized light passes through a birefringent substance, the phases of the two waves that are orthogonal relative to each other are shifted so that the light beam will no longer be linearly polarized light (and will be substantially elliptically polarized light). Therefore, once birefringence arises in the crystal, the degree of polarization of light that enters the crystal as P-polarized light is degraded as it is transmitted through the inside of the crystal so that consequently the intensity of light of the P-polarized light component is reduced. Therefore, the relationship between the optical axis of the laser and the crystal axis needs to be such that they are arranged so as to be able to suppress the degradation in the inside of the crystal relative to the high intensity ultraviolet laser beam in order to raise the degree of polarization and suppress degradation thereof.

Now, the distribution of magnitudes of birefringence by the crystal orientation of CaF$_2$ will be described below. Birefringence in crystal may include intrinsic birefringence that intrinsically exists even in ideal crystal that is free from external turbulences and stress birefringence that arises when dynamic and/or thermal stress is externally applied. Recently, it has been found that intrinsic birefringence is found even in calcium fluoride that is equiaxed crystal. The influence of intrinsic birefringence increases as the inter-atom gap of crystal becomes close to the wavelength of light. Therefore, the influence of intrinsic birefringence is significant and unnegligible when crystal is used in the short wavelength region of an ArF excimer laser or an F$_2$ laser. The magnitude of birefringence varies remarkably depending on the laser optical axis and the crystal orientation for both intrinsic birefringence and stress birefringence but can computationally be determined.

Figure 4:
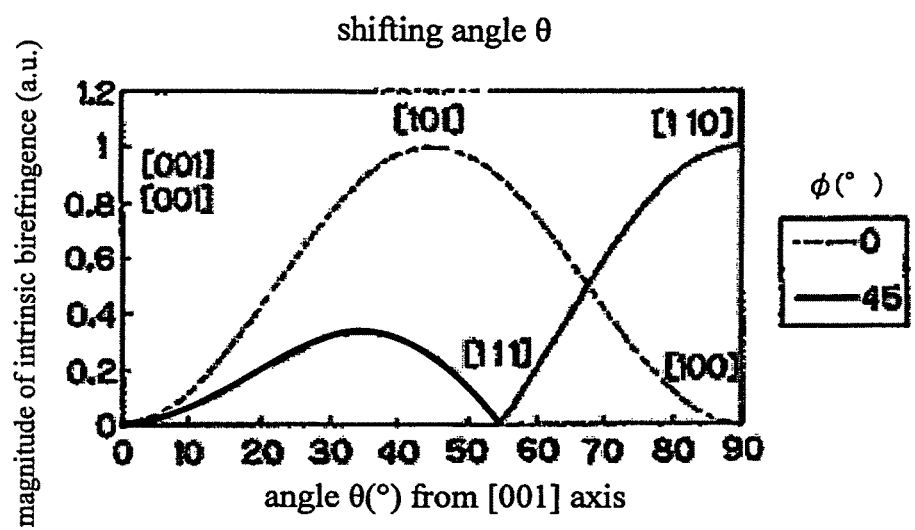
FIG. 4 is graphs illustrating the distribution of magnitudes of intrinsic birefringence of $CaF_2$ by crystal orientation.
Figure 4:
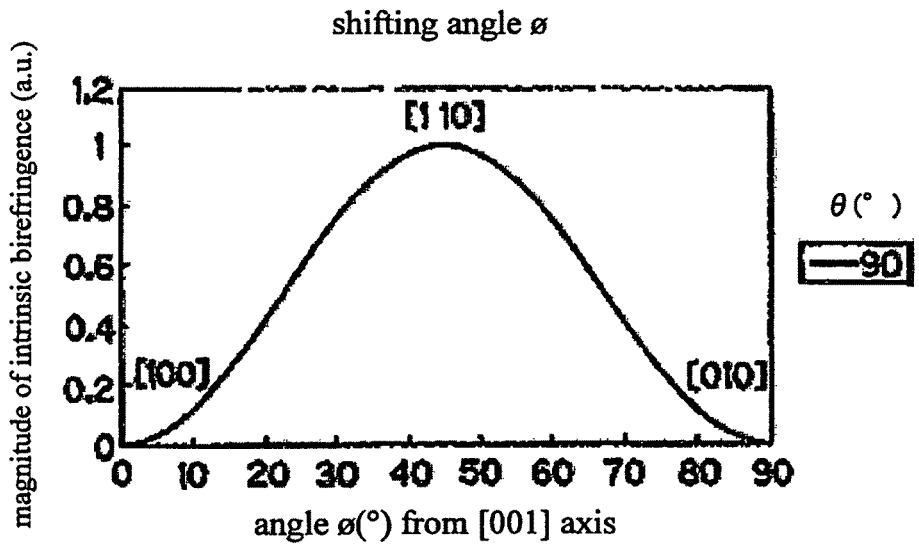

FIG. 4 is graphs illustrating the distribution of magnitudes of intrinsic birefringence of CaF$_2$ by crystal orientation.

When the angles θ and ø of the proceeding direction L of light relative to the axes [001] and [100] of $CaF_2$ crystal are defined in a manner as illustrated in FIG. 2, intrinsic birefringence will be such as illustrated in FIGS. 4(*a*) and 4(*b*). The solid line in FIG. 4(*a*) illustrates the magnitude of intrinsic birefringence observed when the angle θ of the proceeding direction L of light relative to the axis [001] is shifted within a range between 0° and 90°, while maintaining ø to 45°, whereas the dotted line in FIG. 4(*a*) illustrates the magnitude of intrinsic birefringence observed when the angle θ of the proceeding direction L of light relative to the axis [001] is shifted within a range between 0° and 90°, while maintaining ø to 0°. The solid line in FIG. 4(*b*) illustrates the magnitude of intrinsic birefringence observed when the angle ø of the proceeding direction L of light relative to the axis [100] is shifted within a range between 0° and 90°, while maintaining θ to 90°. As clearly seen from FIGS. 4(*a*) and (*b*), intrinsic birefringence is equal to nil in the directions of crystal orientations of [111], [100], [010] and [001] and maximized in the directions of crystal orientations of [110], [011] and [101].

Figure 5:
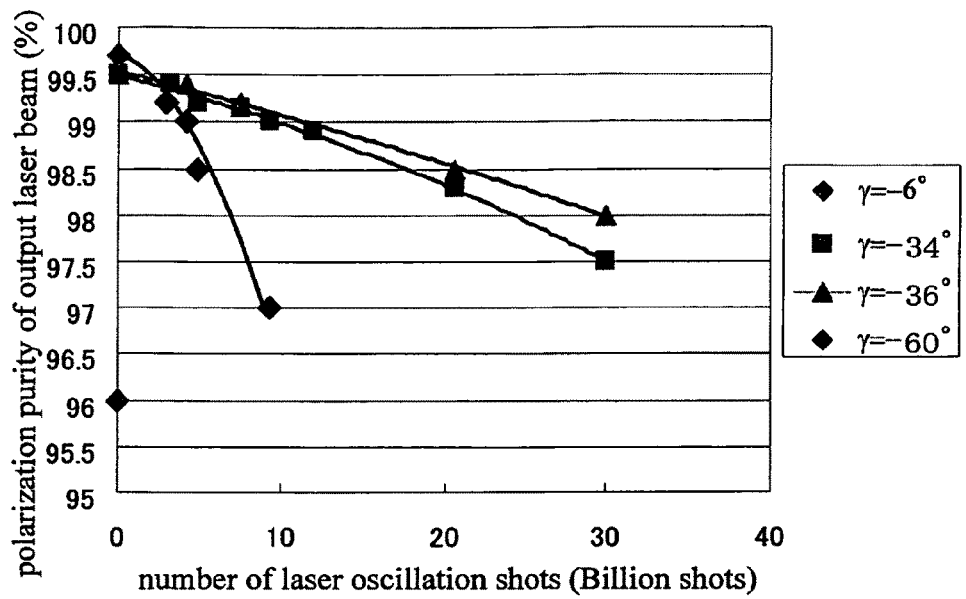
FIG. 5 is a graph illustrating the relationship between the number of laser oscillation shots and the degree of polarization of the output laser beam.

FIG. 5 is a graph illustrating the relationship between the number of laser oscillation shots and the degree of polarization of the output laser beam.

More specifically, the graph illustrates the relationship between the number of laser oscillation shots and the degree of polarization of the output laser beam obtained by preparing a $CaF_2$ crystal having a surface that is a face running in parallel with the (111) crystal face with Brewster windows arranged at a rotary orientation angle of γ=−6° that minimizes the intrinsic birefringence (near the [001] axis), a rotary orientation angle of γ=−60° that maximizes the intrinsic birefringence (near the axis) and rotary orientation angles of γ=−34° and −35° near the middle of the [001] axis and the [101] axis and mounted in the laser chamber of the amplification stage of a 2-stage laser system, which will be described hereinafter, and driving the laser system for durable operation with an ArF laser output of 40 W and a repetition frequency of 4,000 Hz.

When the rotary orientation angle is γ=−6° (entering substantially from the direction of [001]), the initial degree of polarization of the output laser beam was 99.7% and got to 97% after about 10 billion shots.

When the rotation specifying orientation angle is γ=−34° and −36°, the initial degree of polarization of the output laser beam was about 99.5% and got to 97.5% after about 30 billion laser oscillation shots.

Furthermore, when rotation specifying orientation angle is γ=−600 (entering substantially from the direction of [101]), the degree of polarization of the output laser beam was 96%.

In this way, the degree of polarization can be improved by aligning the laser optical axis with the rotation specifying orientation axis obtained by rotating the [001] axis around the axis.

Additionally, it was found by a durability test that degradation with time of the degree of polarization can be suppressed by aligning the laser optical axis with the rotation specifying orientation axis in an intermediate region between γ=−10° and −50° or between +10° and +50°, preferably between γ=−30° and −40° or between +30° and +40°, more preferably between γ=−34° and −36° or between +34° and +36° (of for example, the [001] axis and the [010] axis, the [001] axis and the [011] axis, the [010] axis and the [011] axis, the [010] axis and the [110] axis, the [100] axis and the [010] axis or the [100] axis and the [101] axis).

Figure 6:
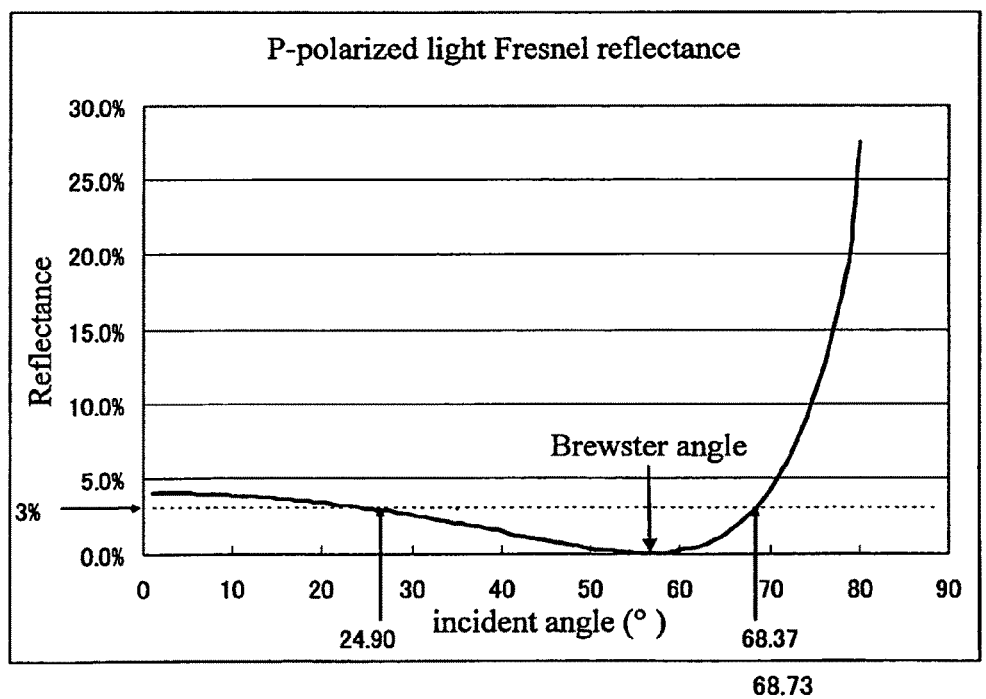
FIG. 6 is a graph illustrating the relationship between the angle of entering the surface of $CaF_2$ crystal and the reflectance of P-polarized light.

Now, the relationship between the angle of entering the surface of $CaF_2$ crystal and the reflectance of P-polarized light will be described below. FIG. 6 is a graph illustrating the relationship between the angle of entering the surface of $CaF_2$ crystal and the reflectance of P-polarized light.

When light enters a transparent medium having a refractive index n from the air at incident angle ø, the reflectance $R_p$ for P-polarized light and the reflectance $R_s$ for S-polarized light are determined by the Fresnel formula, or formula (I), shown below.

$$R_p = \tan^2(ø-X)/\tan^2(ø+X) \text{ and}$$

$$R_s = \sin^2(ø-X)/\sin^2(ø+X) \quad (1),$$

where sin ø=n·sin X (Snell's law).

Figure 7:
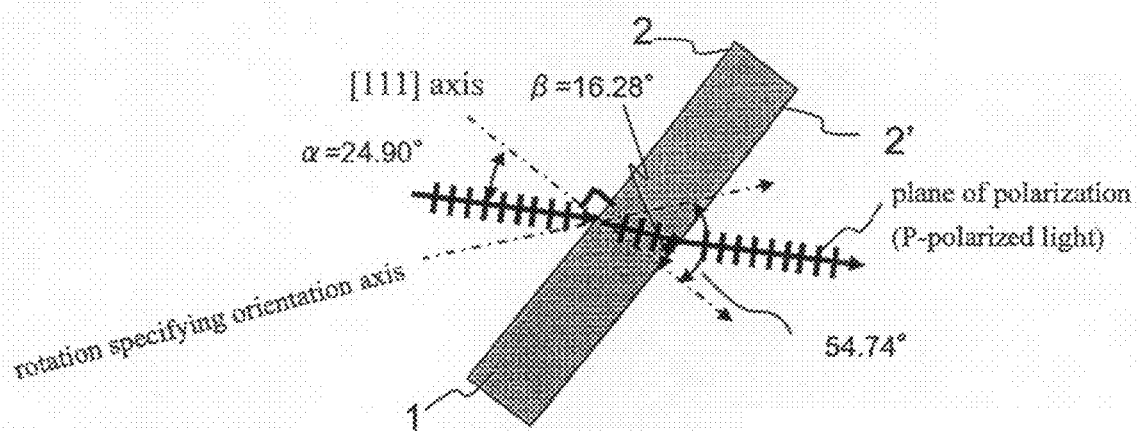
FIG. 7 is an illustration of the relationships between the optical axis and the axis of $CaF_2$ crystal obtained when the incident angle relative to a $CaF_2$ window is made equal to 24.9° and when it is made equal to 68.73°.
Figure 7:
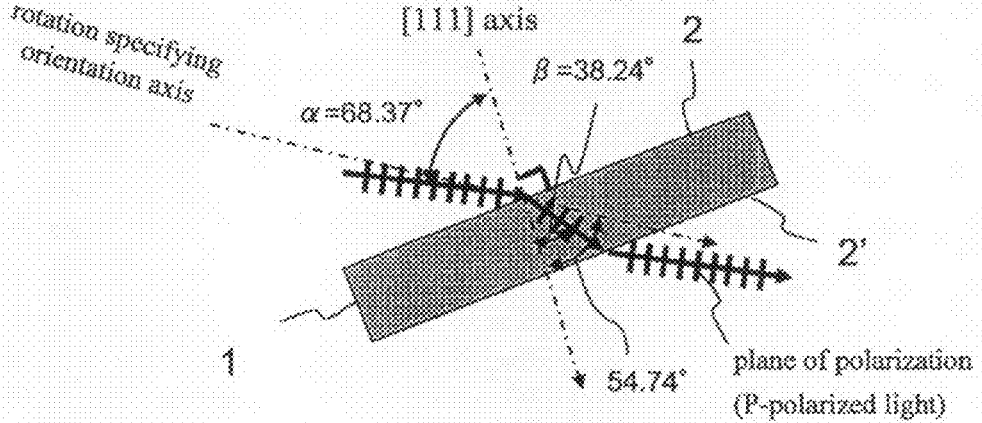

As illustrated in FIG. 7, if the wavelength is 193 nm and the refractive index of the $CaF_2$ crystal is 1.501958 for example, the Fresnel reflectance for P-polarized light component is 4.02% when the incident angle is 0° (perpendicularly entering) and the incident angle that makes the Fresnel reflectance equal to 3% for P-polarized light will be 24.90°. Thereafter, the Fresnel reflectance monotonously decreases until the incident angle gets to Brewster angle (56.34°). The reference for P-polarized light gets to 0% at the Brewster angle. Subsequently, the Fresnel reflectance monotonously increases when the incident angle exceeds the Brewster angle. The incident angle that makes the Fresnel reflectance equal to 3% for P-polarized light will be 68.73°.

If windows of $CaF_2$ crystal that provide Fresnel reflection at the opposite surfaces thereof are mounted in a laser chamber, the energy loss of the laser resonator will be minimized when they are installed at the Brewster angle (56.34°) that makes the reflectance for P-polarized light equal to 0.

If the Fresnel reflection per surface for P-polarized light of a laser window of a resonator whose allowable range of energy loss that can maintain the output of the laser is assumed to be 3%, the incident angle to the $CaF_2$ window is preferably within a range between 24.9° and 68.73°.

FIG. 6 is a graph illustrating the relationship between the optical axis of light entering a $CaF_2$ window at an incident angle of 24.9° and 68.73° and the axis of the $CaF_2$ crystal. The $CaF_2$ crystal 1 is polished at surfaces 2 and 2' that are parallel to the (111) crystal face. The surface of the (111) crystal face is hardest and harder than any other crystal surfaces and hence it can be polished with low surface coarseness and few latent flaws.

FIG. 7(*a*) is an illustration of when the incident angle is made equal to 24.90°. As a P-polarized laser beam enters an optical element of $CaF_2$ crystal at incident angle α of 24.90°, it is refracted at angle of refraction β=16.28° in the inside of the $CaF_2$ crystal according to the Snell's law at the surface 2. The $CaF_2$ crystal is so arranged that the optical axis of refraction in the inside of the $CaF_2$ crystal is transmitted in the plane that includes the [111] axis and the rotation specifying orientation axis of the $CaF_2$ crystal. After being transmitted through the $CaF_2$ crystal, the laser beam is refracted again at the surface 2' as at the surface 2 according to the Snell's law to propagate in the gas once again.

FIG. 7(*b*) is an illustration of when the incident angle is made equal to 68.73. As a P-polarized laser beam enters an optical element of $CaF_2$ crystal at incident angle α of 68.73°, it is refracted at angle of refraction β=38.24° in the inside of the $CaF_2$ crystal according to the Snell's law. The $CaF_2$ crystal is so arranged that the optical axis of refraction in the inside of the $CaF_2$ crystal is transmitted in the plane that includes the [111] axis and the rotation specifying orientation axis of the $CaF_2$ crystal. After being transmitted through the $CaF_2$ crystal, the laser beam is refracted again at the surface 2' as at the surface 2 according to the Snell's law to propagate in the gas once again.

An X-ray diffraction analysis may be made to measure the crystal orientation in advance before fitting the window 1. A first mark may be put to the lateral surface in the direction of the [001], [100] or [010] axis of the window 1, a second mark may be additionally put to the rotation specifying orientation axis after rotating the window relative to the first mark and it is efficient that the window is fitted in accordance with the second mark.

Laser output light can be obtained with a high degree of polarization by using the (111) crystal face of $CaF_2$ crystal as window surface, making a laser beam enter the $CaF_2$ crystal at an incident angle within a range between 24.90° and 68.73° so as to minimize the Fresnel reflection of P-polarized light and rotating the $CaF_2$ crystal around the [111] axis. Additionally, degradation of the inside of the crystal driving unit to a high intensity ultraviolet laser beam can be suppressed by arranging the $CaF_2$ crystal, limiting the rotation specifying orientation angle. Then, as a result, it is possible to suppress degradation with time of the degree of polarization of the output laser beam.

Figure 8:
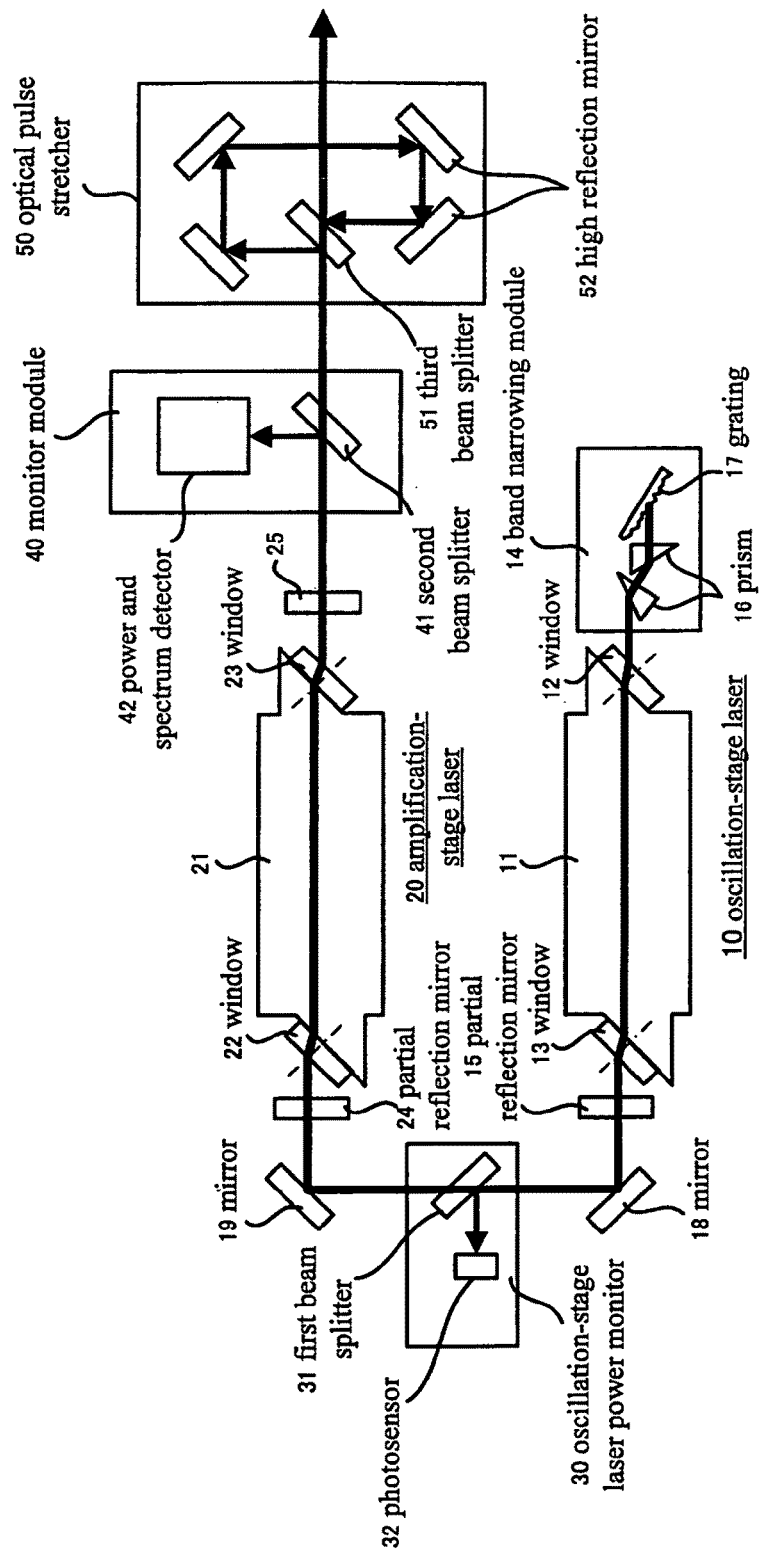
FIG. 8 is a schematic cross-sectional view of a laser system realized by applying an optical element for an ultraviolet gas laser according to the present invention.

An optical element for an ultraviolet gas laser according to the present invention is described above by way of an instance where it is employed as window. However, it can be used at some other site of a laser apparatus. FIG. 8 is a schematic illustration of the configuration of the optical system of 2-stage laser system and an example of arrangement of an optical element for a ultraviolet gas laser according to the present invention in the laser system.

The 2-state laser system includes an oscillator laser 10 and an amplifier laser 20 for receiving the laser beam (seed beam) oscillated by the oscillator laser 10 and amplifies it. Such a system is expected for ArF excimer laser apparatus and $F_2$ laser apparatus particularly for exposures that require a high output level not less than 40 W in a narrow band.

The oscillator laser 10 includes a chamber 11 for containing laser gas in a sealed condition, a band narrowing module 14 for forming a resonator and a partial reflection mirror 15 that operates as output mirror. It additionally includes a laser gas energizing system and a control system, which are not illustrated, as well as a cooling system and a gas exchange system.

Two windows 12 and 13 are arranged on the optical axis in the laser chamber 11. The band narrowing module 14 includes a single beam expanding prism or a plurality of beam expanding prisms 16 (two in FIG. 8) for forming a beam expanding optical system and a grating 17 (or an etalon) that operates as band narrowing element.

The amplifier laser 20 also includes a laser chamber 21 for containing laser gas in a sealed condition and partial reflection mirrors 24, 25 for forming a resonator. It additionally includes a laser gas energizing system and a control system, which are not illustrated, as well as a cooling system and a gas exchange system.

Two windows 22 and 23 are arranged on the optical axis in the laser chamber 21. Referring to FIG. 8, the laser beam oscillated by the oscillator laser 10 is reflected by the mirrors 18 and 19 to enter the amplifier laser 20. Since laser windows are arranged in the resonators of the oscillation stage laser and the amplification stage laser, the laser beam reciprocate for a large number of times.

Therefore, it is possible to obtain an output laser beam with a high degree of polarization by polishing the surface of a $CaF_2$ crystal along the (111) crystal face and rotating the $CaF_2$ crystal around the [111] axis. Then, it is possible to suppress degradation of the inside of the crystal due to a high intensity ultraviolet laser beam by limiting the rotation specifying orientation angle for arranging the $CaF_2$ crystal. Then, as a result, it is possible to suppress degradation with time of the degree of polarization of the output laser beam.

The windows 12, 13, 22 and 23 to be fitted to the laser chambers 11, 21 are desirably formed by using optical elements for ultraviolet gas lasers according to the present invention.

The partial reflection mirror 15 that is a component of the resonator of the oscillator laser 10 and the partial reflection mirrors 24, 25 of the amplifier laser 20 are desirably cut along the (111) crystal face to minimize birefringence and the optical axis of the laser beam to be transmitted through the inside of the $CaF_2$ crystal is desirably made perpendicular relative to the (111) crystal face.

Effect similar to those described above can be obtained by applying the present invention to a MOPA (master oscillator power amplifier) system formed by removing the partial reflection mirrors 24, 25 of an amplifier laser 20.

The present invention is also applicable to a beam splitter for sampling the beam of a laser system. Such a beam splitter may be provided with AR coating at one of the surfaces and partial reflection coating at the other surface thereof. When such a beam splitter is employed for sampling, utilizing Fresnel reflection, a non-coated $CaF_2$ crystal substrate is employed.

In the above-described instance, the present invention is applied to the first beam splitter 31 for sampling the beam of oscillation stage laser power monitor 30 and the second beam splitter 41 for sampling the beam of monitor module 40 for measuring the energy and the spectrum of the laser beam after amplification.

The present invention is also applicable to the third beam splitter 51 used for optical pulse stretcher 50. The third beam splitter is provided with AR coating at one of the surfaces and partial reflection coating (about R=60%) at the other surface thereof.

In the case of these beam splitters, a laser beam is normally made to enter at an incident angle of α=45° so that the refraction angle in the $CaF_2$ crystal is β=28.09°.

FIG. 9 is an illustration of instances of arranging one or two beam expanding optical systems 91, 91', each being formed by combining two wedge substrates, in the resonator of an amplification stage laser. FIG. 9(a) is an illustration of an instance where a single beam expanding optical system 91' is arranged only at the output side, whereas FIG. 9(b) is an illustration of an instance where two beam expanding optical systems 91, 91' are arranged respectively at the rear side and at the output side.

When beam expanding optical systems 91, 91' are arranged in the resonator of an amplification stage laser, the laser beam reciprocates for a large number of times as a result of laser oscillation so that it is possible to obtain an output laser beam with a high degree of polarization by polishing the surface of the $CaF_2$ crystals of the beam expanding optical systems 91, 91' along the (111) crystal face and rotating the $CaF_2$ crystals around the [111] axis. Then, it is possible to suppress degradation of the inside of the crystals due to a high intensity ultraviolet laser beam by limiting the rotation specifying orientation angle for arranging the $CaF_2$ crystals. Then, as a result, it is possible to suppress degradation with time of the degree of polarization of the output laser beam.

Figure 10:
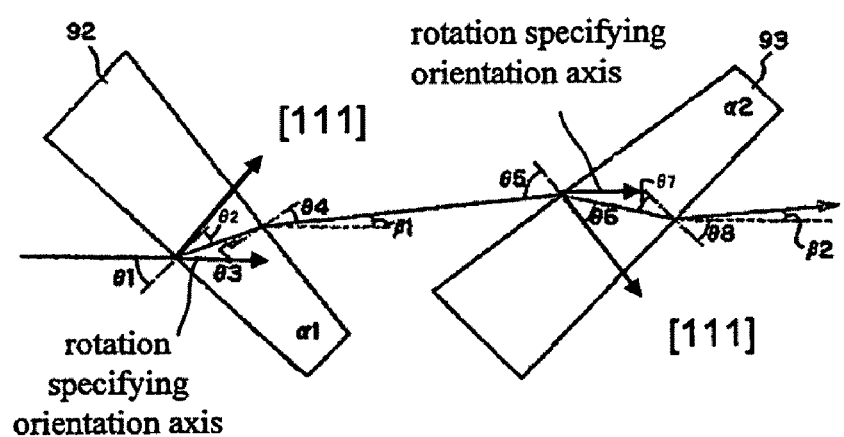
FIG. 10 is a schematic illustration of laser beam paths produced when a laser beam enters two wedge substrates.
Figure 10:
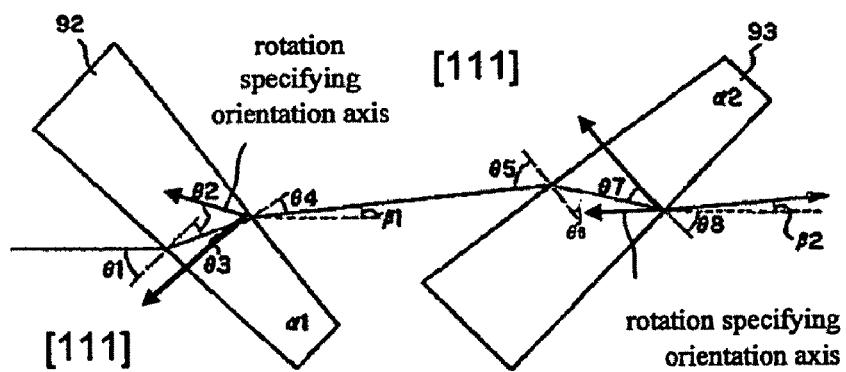

FIG. 10 is an illustration of exemplar arrangements of the beam expanding optical systems 91, 91', each being formed by using two wedge substrates 92, 93. The second wedge substrate 93 is arranged in such a way that it is turned upside down relative to the first wedge substrate 92 so as to make the distance separating them downwardly increase and the laser beam enter them at a same incident angle. With such an arrangement, the optical axis of the laser beam after exiting the beam expanding optical systems 91, 91' runs in parallel with the optical axis of the laser beam before entering the beam expanding optical systems 91, 91' (angle of deviation β=0°). The underlying theorem of the arrangement will be described below by referring to FIG. 10. FIG. 10 illustrates the laser beam path when a laser beam enters two wedge substrates 92, 93. If the angles of the laser beam path relative to the second wedge substrate 93 are θ5, θ6, θ7 and θ8 and the angle of deviation of the laser beam exiting the first wedge substrate 92 is β1, while the angle of deviation of the laser beam exiting the second wedge substrate 93 is 2, the following equations hold true:

$$\beta1=\theta1-\theta2+\theta3-\theta4 \quad (11) \text{ and}$$

$$\beta2=\theta1-\theta5+\theta6-\theta7+\theta8 \quad (12).$$

If the second wedge substrate 93 has a profile same as the first wedge substrate 92 but turned upside down relative to the latter and the laser beam is made to enter the two wedge substrates at a same incident angle (θ5=θ1). The following equations hold true:

$$\theta5=\theta1 \quad (13),$$

$$\theta6=\theta2 \quad (14),$$

$$\theta7=\theta3 \quad (15),$$

$$\theta8=\theta4 \quad (16) \text{ and}$$

$$\alpha1=\alpha2 \quad (17).$$

As the equation (12) is substituted by the equations (13) through (17), $$\beta2=0 \quad (18)$$

holds true.

In short, when the above requirements are met, the angle of deviation can be reduced to nil and the optical axis of the exiting laser beam can be made to be parallel with the optical axis of the laser beam in the chamber 3. A beam expander formed by combining two wedge substrates is dependent only to a small extent on the exit angle of a laser beam that varies due to the varying wavelength and is employed as beam expander for expanding a beam in the resonator of an amplification stage laser or an amplified beam.

The incident angle to the wedge substrates 92, 93 is more often than not made greater than the Brewster angle (56.34° in the case of an ArF laser depicting a wavelength of 193.368 nm), which makes the reflectance of P-polarized light equal to nil. If such is the case, anti-reflection film needs to be applied to the surfaces thereof in order to make the reflectance of P-polarized light negligible for the incident angle.

For example, when a beam expanding optical system is designed with a beam expanding ratio of 2.0 times, the incident angle and the wedge angle will be 68.7° and 4.4° respectively. The incident angle relative to the rear surface of the wedge substrate will be 60.0°. The reflectance of P-polarized light for Fresnel reflection of an incident angle of 60.0° is 0.2% and hence it is not necessary to apply anti-reflection film to the surface thereof but anti-reflection film needs to be applied to the first surface because the angle is 68.7°.

In the instance of FIG. 10(a), the wedge substrate is prepared with the face orientation of the incident side thereof held in parallel with the (111) crystal face. Then, a laser beam that enters it at an incident angle of 68.7° is refracted at 38.34° in the CaF₂ crystal according to the Snell's law and refracted at the exiting side surface. The wedge substrate is so arranged that the optical axis is in the plane that includes the face orientation [111] axis and the rotation specifying orientation axis and found within the angle formed by the crystal axes. Then, the laser beam exists from the exiting surface of the wedge substrate with an angle of refraction of 60.0°.

Additionally, the second wedge substrate is also arranged such that the optical axis and the crystal axes depict a similar relationship. In this way, it is possible to obtain an output laser beam with a high degree of polarization by polishing the surface of a CaF₂ crystal along the (111) crystal face and rotating the CaF₂ crystal around the [111] axis. Then, it is possible to suppress degradation of the inside of the crystal due to a high intensity ultraviolet laser beam by limiting the rotation specifying orientation angle for arranging the CaF₂ crystal. Then, as a result, it is possible to suppress degradation with time of the degree of polarization of the output laser beam. Furthermore, the light entering surface is polished so as to be made parallel with the (111) crystal face so that it is possible to produce a surface that depicts a low degree of surface coarseness and few latent flaws. Then, the damage threshold value of the anti-reflection film due to laser beam irradiation is improved.

In the instance of FIG. 10(b), the wedge substrate is prepared with the face orientation of the light exiting side thereof held in parallel with the (111) crystal face and arranged in such a way that the optical axis of the laser beam passing the inside of the CaF₂ is in the plane that includes the face orientation [111] axis and the rotation specifying orientation axis and found within the angle formed by the crystal axes.

When the energy density of the incident side surface is high, the arrangement of FIG. 10(a) illustrates an improved level of withstanding laser beams for the film because the (111) surface is the surface whose energy density is high if compared with the arrangement of FIG. 10(b).

Now, another embodiment of the invention will be described below.

Figure 11:
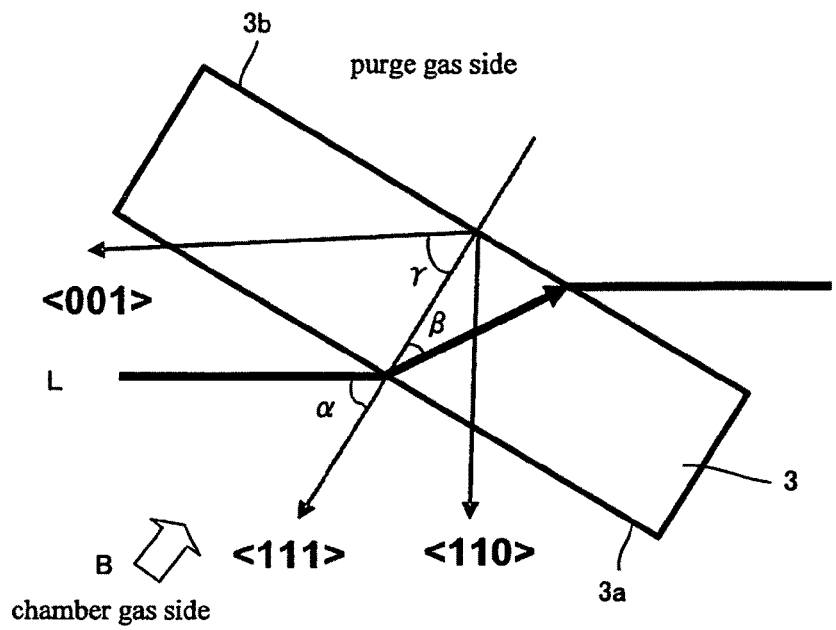
FIG. 11 is a schematic cross-sectional view of a window before it is rotated.
Figure 12:
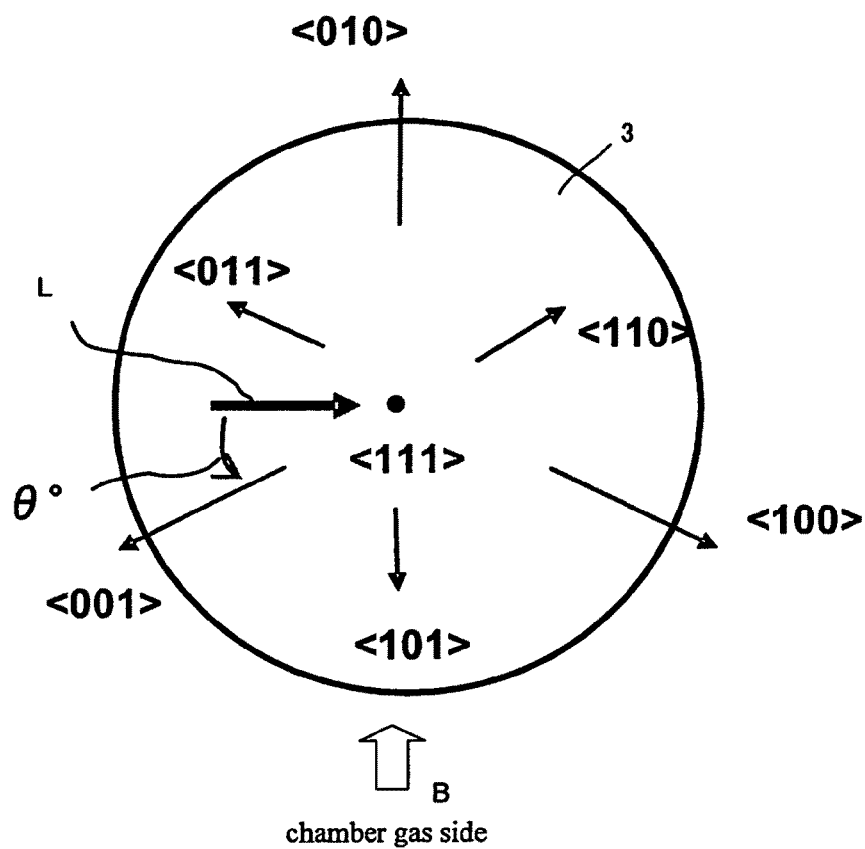
FIG. 12 is a schematic top view of a window after it is rotated.

FIG. 11 is a schematic cross-sectional view of window 1 formed by using CaF₂ (calcium fluoride) before it is rotated and FIG. 12 is a schematic top view of the window 1 after it is rotated.

FIG. 11 is a cross-sectional view of the CaF₂ crystal taken along the plane that includes the [001] axis, the [110] axis and the [111] axis. The window 1 of CaF₂ crystal is polished at the first surface 3a and the second surface 3b that runs in parallel with the (111) crystal face. For example, in this embodiment, a laser beam enters the window 1 at the center thereof relative to the CaF₂ crystal substrate in the plane that includes the [001] axis, the [110] axis and the [111] axis at incident angle α=55.7°. Then, the laser beam is refracted with angle of refraction β=33.4° at the first surface 2 according to the Snell's law. The CaF₂ crystal is so arranged that the optical axis of refraction L in the inside of the CaF₂ is transmitted in the plane that includes the [001] axis, the [110] axis and the [111] axis and within the angle formed by the [111] axis and the [001] axis (0°<γ<54.7°). After being transmitted through the CaF₂ crystal, the laser beam exits the window 1 in the plane that includes the [001] axis, the [110] axis and the [111] axis at incident angle α=55.7° at the second surface 3b as at the first surface 3a according to the Snell's law.

In this embodiment, the window 1 is arranged at a position rotated counterclockwise by 30° around the central axis of the [111] axis from this state.

FIG. 12 is a schematic top view of a CaF₂ crystal as viewed from right above the [111] axis. The face orientation axes of the CaF₂ crystal are shown radially. The axes of crystal orientation is threefold symmetrical when the [111] axis is the axis of symmetry since the CaF₂ crystal is a face-centered cubic lattice. Therefore, if the $CaF_2$ crystal window is viewed from right above and the [001] axis is selected as reference axis, while the angle as viewed clockwise is negative and the angel as viewed counterclockwise is positive, then the angle formed by the [001] axis and the [011] axis is −60° and the angle formed by the [001] axis and the [010] axis is −120°, whereas the angle formed by the [001] axis and the [110] axis is 180° and the angle formed by the [001] axis and the [101] axis and the angle formed by the [001] axis and the [100] axis are 60° and 120° respectively.

As illustrated in FIG. 12, the window 1 is arranged at a position rotated counterclockwise by 30° around the central axis of the [111] axis relative to the arrangement where the laser beam entering the crystal passes the plane that includes the [111] axis and the [001] axis.

Now, the result obtained by arranging a measurement window 102 at the incident angle of light that is used in the chamber, rotating it around the central axis of the [111] axis, shifting the crystal orientation in the direction of propagation of light and observing the varying state of polarization.

Figure 13:
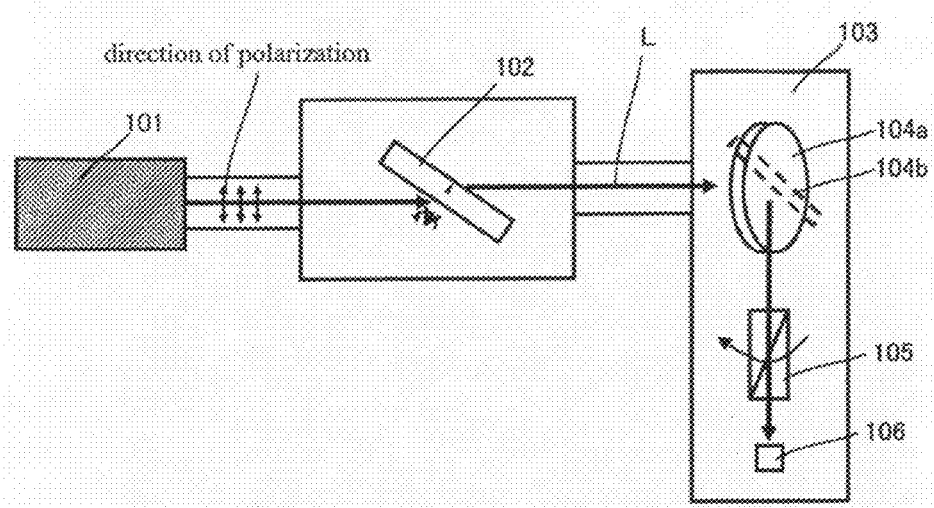
FIG. 13 is a schematic block diagram of a state of polarization observation experiment system.
Figure 14:
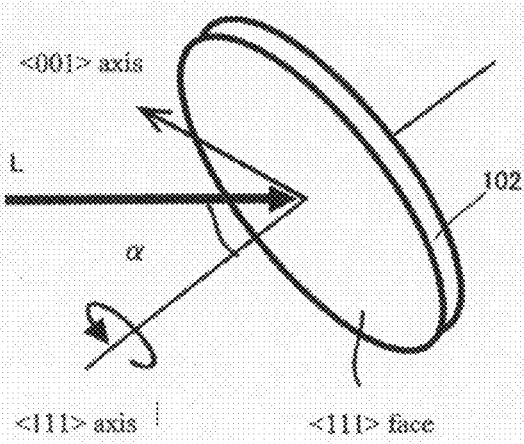
FIG. 14 is a schematic illustration of a window for measurements.

FIG. 13 is a schematic illustration of polarization state observation experiment system. A linearly polarized laser beam emitted from a narrow band ArF laser 101 (4 kHz, 10 mJ) was used and a window for measurement 102 was arranged with an incident angle of α=55.7° so as to be able to simulate an arrangement where it is used as chamber window. The direction of polarization of the entering laser beam was made to be in line with that of the actual device and the laser beam was made to enter in a direction parallel to the sheet of FIG. 13. After passing through the window for measurement 102, the laser beam was made to enter a degree of polarization meter 103 to measure its linear degree of polarization. In the degree of polarization meter 103, two folding windows 104a, 104b are used in order to prevent the degree of polarization of the reflected laser beam from being shifted by folding the light path. The laser beam is made to pass a lotion prism 105 and the output thereof is observed by means of a sensor 106. The lotion prism 105 was driven to rotate while observing the output and the linear degree of polarization was measured. As illustrated in FIG. 14, the window for measurement 102 was cut along the (111) crystal face and driven to rotate around the [111] axis that operated as center of rotation at intervals of 10° and the change of the linear degree of polarization was measured over the range of 0 through 360°.

Figure 15:
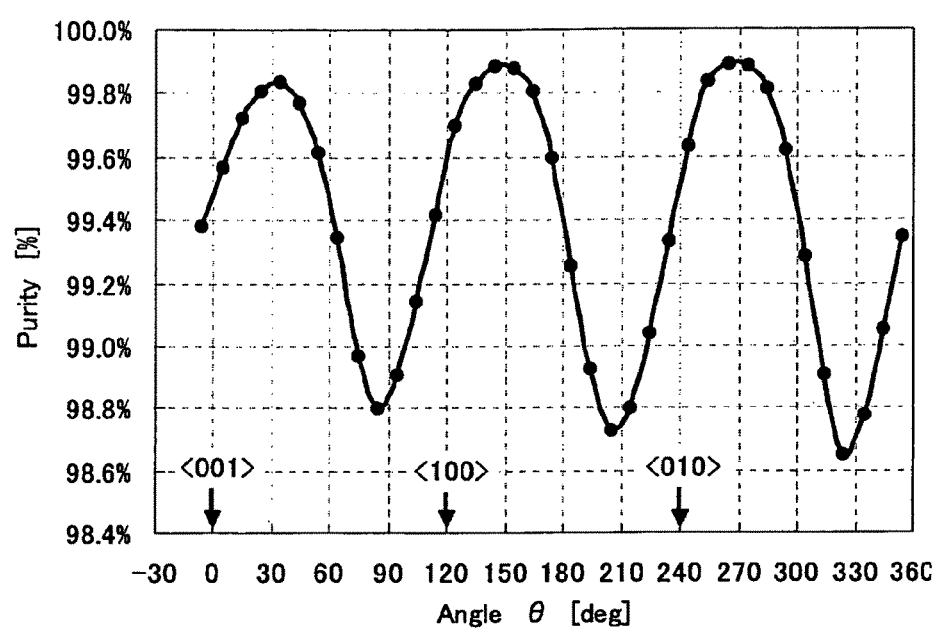
FIG. 15 is a graph illustrating the results of measurement of degree of polarization relative to rotation angle.

FIG. 15 is a graph illustrating the results of measurement of the degree of polarization relative to the rotation angle. θ=0° refers to that the optical axis is in the direction of the [001] axis. The positive direction of the rotation angle θ refers to that the window for measurement 102 was driven to rotate counterclockwise.

As illustrated in FIG. 15, it was found that the angle that makes the degree of polarization best is not the directions of the [001] axis, the [100] axis and the [010] axis that minimize intrinsic birefringence but the positions obtained by rotating the window for measurement counterclockwise by θ=30° from those directional positions.

Figure 16:
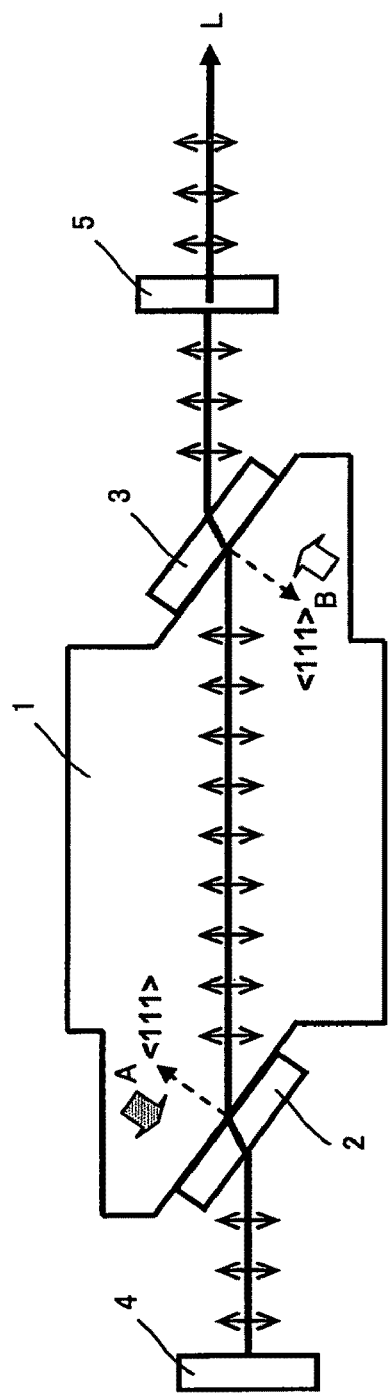
FIG. 16 is a schematic illustration of a window formed by using $CaF_2$ according to the present invention.
Figure 17:
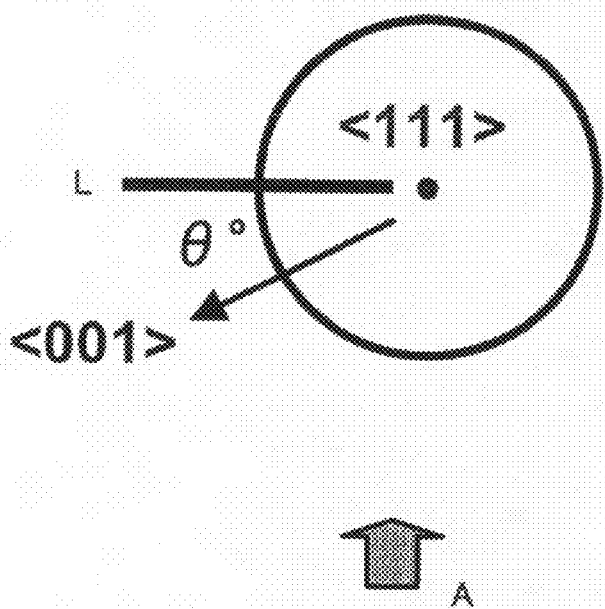
FIG. 17 is a schematic illustration of the window of FIG. 3 as viewed from the inside of the chamber.
Figure 17:
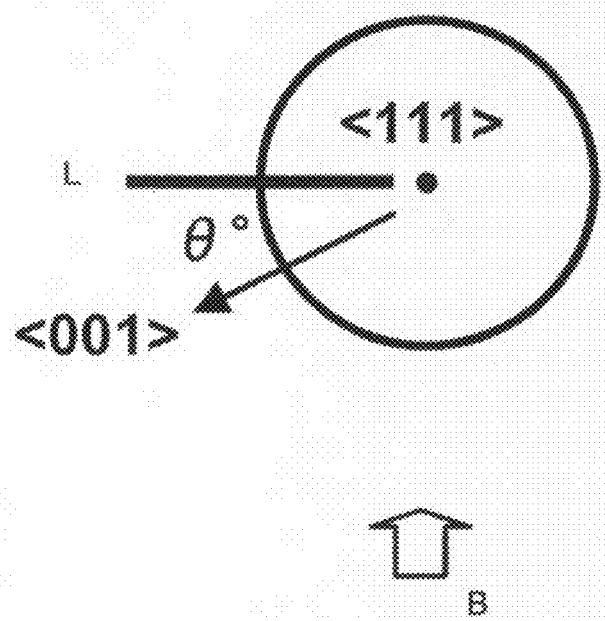

FIGS. 16 and 17 illustrate an instance where the $CaF_2$ (calcium fluoride) window of this embodiment is used in the chamber 21 of the 2-stage laser system illustrated in FIG. 8. FIG. 16 is a schematic illustration of the chamber 21 while FIG. 17(a) is a view of the first window 22 as viewed in the direction of arrow A in the chamber and FIG. 17(b) is a view of the second window 23 as viewed in the direction of arrow B in the chamber.

Two windows including the first window 22 and the second window 23 are fitted to the chamber 21 and arranged on the optical axis L as described above. The laser beam oscillated from an oscillation laser (not illustrated) is made to enter the chamber 21. The laser beam reciprocates between the first window 22 and the second window 23 for a large number of times due to the first partial reflection mirror 24 and the second partial reflection mirror 25.

The first window 22 and the second window 23 of this embodiment are cut along the (111) plane of $CaF_2$ crystal for the opposite surfaces thereof as illustrated in FIG. 11 and arranged aslant relative to the laser optical axis L. Then, in this embodiment, both the first window 22 and the second window 23 are arranged at respective positions rotated counterclockwise around the central axis of the [111] axis by a same angle of θ=30° from the positions at which the laser beam that enters the crystal passes through the plane that includes the [111] axis and the [010] axis as viewed from the inside of the chamber 21 (refer to arrow A, B in FIG. 16), as illustrated in FIG. 17(a) and FIG. 17(b).

When determining the angle, an X-ray diffraction analysis is preferably made in advance to measure the crystal orientations of the [001] axis, the [010] axis and the [100] axis. Preferably, the window can be fitted efficiently by putting a mark to the lateral surfaces of the windows running in the directions of the [001] axis, the [010] axis and the [100] axis and rotating the windows are rotated counterclockwise by the angle of θ=30° before fitting them in position.

While an angle of θ=30° is selected and the windows are rotated counterclockwise by that angle in the embodiment of FIGS. 11 through 17, the angle may not necessarily be 300 flat and it may be allowable when it is found within the range of about 30°±10°.

Therefore, a window 1 prepared by cutting calcium fluoride crystal along the (111) crystal face at the opposite surfaces thereof is employed for a chamber window to be tilted relative to the laser optical axis and arranged at the position obtained by rotating it counterclockwise by 30°±10° around the central axis of the [111] axis from the position at which the laser beam that enters the crystal passes the plane that includes the [111] axis and the [001] axis, at the position obtained by rotating it counterclockwise by 30°±10° around the central axis of the [111] axis from the position at which the laser beam that enters the crystal passes the plane that includes the [111] axis and the [010] axis or at the position obtained by rotating it counterclockwise by 30°±10° around the central axis of the [111] axis from the position at which the laser beam that enters the crystal passes the plane that includes the [111] axis and the [100] axis as viewed from the inside of the chamber.

While an optical element for an ultraviolet gas laser and an ultraviolet gas laser apparatus according to the present invention are described above in terms of embodiments, the present invention is by no means limited to the embodiment, which may be modified in various different ways without departing from the spirit and scope of the invention. For example, $CaF_2$ substrate may be adopted not as a window of a laser chamber but as a polarization element and such a polarization element may be arranged in the optical resonator of an amplification-stage laser so as to show the relationship between the laser optical axis and the crystal orientation of the present invention.

What is claimed is:

1. An optical element for a ultraviolet gas laser, the optical element being formed by using calcium fluoride crystal and having a light entering plane and a light exiting plane, ultraviolet rays entering by way of the light entering plane and exiting from the light exiting plane, the optical element comprising:

at least either of the light entering plane or the light exiting plane being parallel to the (111) crystal face of the calcium fluoride crystal;

the laser beam entering from the entering plane passing through:

the plane located between the [111] axis and the first azimuth axis in the locus of rotation of the [001] axis around the [111] axis and including the [111] axis and the first azimuth axis;

the plane located between the [111] axis and the second azimuth axis in the locus of rotation of the [010] axis around the axis and including the [111] axis and the second azimuth axis; or the plane located between the [111] axis and the third azimuth axis in the locus of rotation of the [100] axis around the [111] axis and including the [111] axis and the third azimuth axis; and exiting from the exiting plane.

2. The optical element for a gas laser according to claim 1, wherein the incident angle of the laser beam at the entering plane is within a range between 24.9° and 68.73°.

3. The optical element for a gas laser according to claim 1, wherein the rotation angle of the first azimuth axis from the [001] axis and the rotation angle of the second azimuth axis from the [010] axis and the rotation angle of the third azimuth angle from the [100] axis are respectively not smaller than 34° and not greater than 36°, not smaller than −34° and not greater than −36°.

4. The optical element for a gas laser according to claim 1, wherein the calcium fluoride crystal is cut at the (111) crystal faces for the both surfaces thereof, at the position rotated counterclockwise by 30°±10° around the [111] axis from the position where the laser beam that enters in the crystal passes through the plane including the [111] axis and the [001] axis, at the position rotated counterclockwise by 30°±10° around the [111] axis from the position where the passes through the plane including the [111] axis and the [010] axis or at the position rotated counterclockwise by 30°±10° around the [111] axis from the position where the passes through the plane including the [111] axis and the [100] axis.

5. A gas laser apparatus using optical elements for a gas laser according to claim 1, the apparatus comprising:

a laser chamber;

optical resonators arranged respectively at one side and at the opposite side of the laser chamber;

laser gas contained in the inside of the laser chamber in a sealed state;

a means for energizing the laser gas; and two windows arranged in the laser chamber to allow the laser beam generated from the energized laser gas to exit to the outside of the laser chamber;

the windows being arranged on the optical axes of the optical resonators;

each of the windows being formed by an optical element for a gas laser.

6. The gas laser apparatus according to claim 5, wherein the window is arranged at the position rotated counterclockwise by 30°±10° around the [111] axis from the position where the laser beam that enters in the crystal passes through the plane including the [111] axis and the [001] axis, at the position rotated counterclockwise by 30°±10° around the [111] axis from the position where the passes through the plane including the [111] axis and the [010] axis or at the position rotated counterclockwise by 30°±10° around the [111] axis from the position where the passes through the plane including the [111] axis and the [100] axis as viewed from the inside of the laser chamber for the laser beam entering the crystal.

7. A gas laser apparatus using optical elements for a gas laser according to claim 1, the apparatus comprising:

a laser chamber;

optical resonators arranged respectively at one side and at the opposite side of the laser chamber;

laser gas contained in the inside of the laser chamber in a sealed state;

a means for energizing the laser gas;

two windows arranged in the laser chamber to allow the laser beam generated from the energized laser gas to exit to the outside of the laser chamber; and a beam splitter for splitting a laser beam;

the windows being arranged on the optical axes of the optical resonators;

the beam splitting being formed by an optical element for a gas laser.

8. A gas laser apparatus using optical elements for a gas laser according to claim 1, the apparatus comprising:

a laser chamber;

optical resonators arranged respectively at one side and at the opposite side of the laser chamber;

laser gas contained in the inside of the laser chamber in a sealed state;

a means for energizing the laser gas;

two windows arranged in the laser chamber to allow the laser beam generated from the energized laser gas to exit to the outside of the laser chamber; and a beam expanding optical system;

the wedge substrates of the beam expanding optical system being formed by using optical elements for gas laser.

* * * * *

UNITED STATES PATENT AND TRADEMARK OFFICE
CERTIFICATE OF CORRECTION

| | | |
|---|---|---|
| PATENT NO. | : 7,965,756 B2 | Page 1 of 1 |
| APPLICATION NO. | : 12/545495 | |
| DATED | : June 21, 2011 | |
| INVENTOR(S) | : Osamu Wakabayashi et al. | |

It is certified that error appears in the above-identified patent and that said Letters Patent is hereby corrected as shown below:

On the Title page:

Item [73]. Assignee's city name should read as --TOKYO--

Signed and Sealed this
Sixteenth Day of August, 2011

David J. Kappos
*Director of the United States Patent and Trademark Office*